No. 879,265. PATENTED FEB. 18, 1908.
G. M. HINKLEY, DEC'D.
E. J. HINKLEY & E. L. WOOD, EXECUTORS.
ADJUSTABLE BOX OR BEARING.
APPLICATION FILED MAR. 6, 1905.

UNITED STATES PATENT OFFICE.

GEORGE M. HINKLEY, OF MILWAUKEE, WISCONSIN, ASSIGNOR OF ONE-HALF TO ALLIS-CHALMERS COMPANY, OF MILWAUKEE, WISCONSIN, A CORPORATION OF NEW JERSEY; ELIZABETH J. HINKLEY AND EDGAR L. WOOD EXECUTORS OF SAID GEORGE M. HINKLEY, DECEASED.

ADJUSTABLE BOX OR BEARING.

No. 879,265.     Specification of Letters Patent.     Patented Feb. 18, 1908.

Application filed March 6, 1905. Serial No. 248,506.

*To all whom it may concern:*

Be it known that GEORGE M. HINKLEY, a citizen of the United States, residing at Milwaukee, in the county of Milwaukee and State of Wisconsin, has invented certain new and useful Improvements in Adjustable Boxes or Bearings, of which the following is a specification.

This invention relates to an adjustable box for the bearing of the press roll arm shaft of an edger in the art of saw mill machinery. An example of adjustment for edger press rolls, in which my adjustable box may be used, is found in the patent to W. H. Trout, 780,921, Jan. 24, 1905. It is sometimes necessary in such an edger to adjust the box for the press roll arm vertically. It may be necessary to adjust the box horizontally, but this is not ordinarily required.

Figure 1:
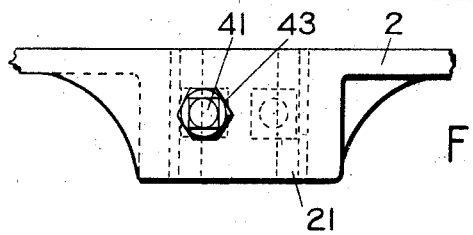
Figure 2:
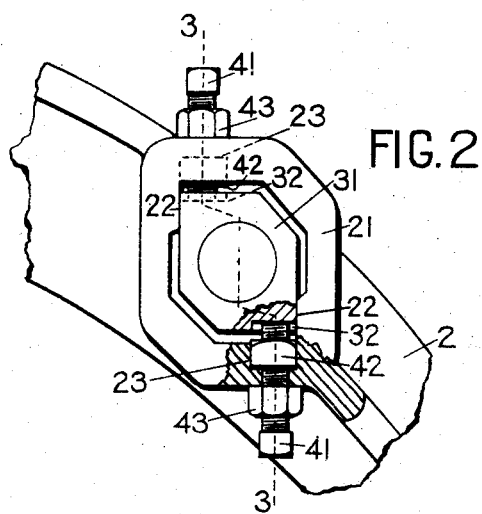
Figure 3:
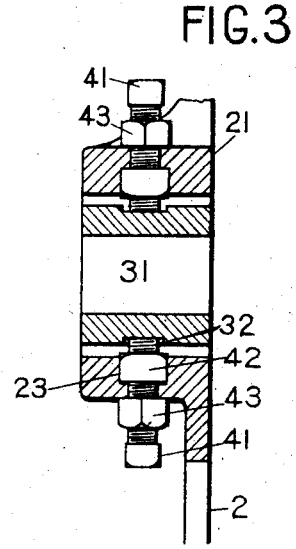
Figure 4:
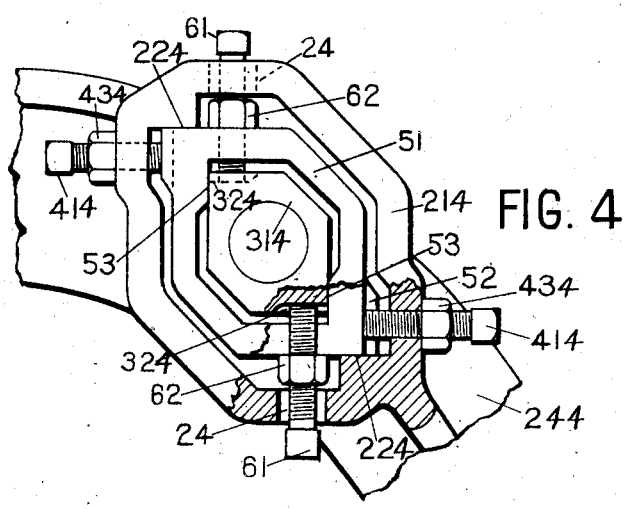

In the drawings,—Figure 1 is a plan view of the adjustable box with a portion of the edge frame. Fig. 2 is an elevation of the same partly in section. Fig. 3 is a section on the line 3, 3, Fig. 2. Fig. 4 is an elevation, partly in section, of a modification showing a universally transversely adjustable box.

Referring to Figs. 1, 2 and 3, the frame 2 of the edger is formed with a frame portion 21. Within the opening of the frame portion 21, is mounted a box 31. The box 31 bears upon internal parallel ways 22, formed in the frame 21. The portions of the box 31 co-acting with these parallel ways 22, are themselves parallel. Sufficient clearance is allowed at all other points between the box 31 and the frame 21.

On the frame 21 are mounted bolts 41, parallel to each other. These bolts 41, bear upon the box 31 so as to produce a stress of rotation setting up a mechanical couple tending to rotate the box 31. This tendency of rotation of the box 31 is resisted by the contact of the box with the frame 21 at the parallel ways 22, such contact of course setting up a mechanical couple acting upon the box 31 in the opposite direction to the other mechanical couple.

By adjusting the bolts 41 in the frame 21, it will be observed that the box may be adjusted vertically to any position within the limits of adjustment. After the adjustment is made, the box will be firmly held within the frame 2 of the machine.

In order to prevent any displacement of the box 31 axially in the frame 21, the bolts 41 co-act with transverse grooves 32 in the box 31. In order to avoid the necessity of tapping the frame 21 for the bolts 41, nuts 42 are threaded upon the bolts 41 and are embedded in recesses 23, in the frame 21. These recesses may be cast in the frame and need not be machined. Lock nuts 43 are used to retain the bolts 41 in their set position.

The modification shown in Fig. 4 represents an application of the invention, as thus far described, to both vertical and horizontal adjustment of the box; the invention thus far described relating only to a vertical adjustment. The modification of Fig. 4 is therefore a universal adjustment in a transverse plane. Referring to Fig. 4, the frame 244 of the machine has formed therein as before, a frame portion 214. Within the hollow of the frame 214 is mounted a second frame 51. The frame 51 co-acts with horizontal parallel ways 224, formed internally on the frame 214. Horizontal bolts 414, are screwed through frame 214 and co-act with the frame 51 so as to produce a stress upon the frame 51, tending to rotate the same, the rotation being prevented by the contact of the frame 51 at the ways 224. By adjusting the bolts 414 in the frame 214, the frame 51 may be horizontally adjusted within the limits of adjustment. Grooves 52, are provided in the frame 51 to prevent axial displacement of the frame 51, as heretofore.

Within the frame 51 is mounted the box 314, co-acting with vertical ways 53, formed in the frame 51. Bolts 61 are screwed through the frame 51 and co-act with the box 314 at the transverse grooves 324 formed therein and produce a stress tending to rotate the box 314. This rotation is prevented by the contact of the box 314 with the frame 51, at the ways 53. The bolts 61 extend through the mortises 24 in the frame 214, which mortises allow horizontal adjustment of the frame 51 by means of the bolts 414, without interference between the bolts 61 and the frame 214. Lock nuts 62, 434, are used, as hereinbefore. The bolts 414 are shown as screwed directly through the frame 214 instead of through a nut 42, as in Fig. 2. The bolts 61, are also screwed directly through frame 51 in the same way. The failure to use nuts 42, Fig. 2, in the modification of Fig. 4, is merely for the sake of clearness in showing this modification, as obviously such nuts may be used.

It will be observed by the modification of Fig. 4, a universal adjustment for the box in a transverse plane is attained, the bolts 414 serving to adjust the box horizontally, while the bolts 61 serve to adjust the box vertically. It is, however, not necessary that the adjustments be at right angles to each other. They may be at any angle to each other. But, obviously, when they are at right angles to each other any adjustment is attained with a minimum of bolt motion. There may be situations, however, in which it may be advisable to have the adjustments at some other angle to each other than a right angle.

It is to be noted that my adjustable box, although described in connection with an edger, may be used in numerous other machines, and I do not wish to be limited in its use to an edger.

I also wish it to be understood that I do not desire to be limited to the exact details of construction shown and described, for obvious modifications will occur to a person skilled in the art.

What I claim is:

1. The combination with an adjustable box provided with an aperture adapted to receive a shaft, of means providing a mechanical couple adapted to subject the box to stress in one direction of rotation about the axis of a shaft, and means providing a second mechanical couple adapted to resist such stress and to prevent rotation of said box.

2. The combination with an adjustable box provided with an aperture adapted to receive a shaft, of means applied thereto affording a mechanical couple about the axis of said shaft, and a second means affording a mechanical couple of opposite direction and resisting the first couple.

3. The combination of a box, means affording parallel ways therefor on opposite sides thereof, and means for adjusting the box on the ways and subjecting the box on opposite sides of its journal to forces opposed in direction and constituting a rotary stress resisted by the ways.

4. The combination of a box, a frame having internal parallel ways therefor on opposite sides of said box, and means on the frame for adjusting the box on the ways and subjecting the box on opposite sides of its journal to forces opposed in direction and constituting a rotary stress resisted by the ways.

5. The combination of a box, a frame having internal parallel ways therefor on opposite sides of said box, and bolts on the frame subjecting the box to rotary stress resisted by the ways for adjusting the box on the ways.

6. The combination of a box, a frame having internal parallel ways therefor on opposite sides of said box and at different ends of said frame, and bolts on the frame subjecting the box to rotary stress resisted by the ways for adjusting the box on the ways.

7. An adjustable box, means providing mechanical couples subjecting the box to stresses in opposite directions of rotation, and a plurality of means providing a plurality of mechanical couples resisting the stresses and preventing rotation.

8. An adjustable box, means applied thereto affording a plurality of mechanical couples of opposite directions, and means affording a plurality of opposing and resisting mechanical couples.

9. The combination of a box, a plurality of means affording therefor parallel ways at an angle to other parallel ways, and means for adjusting the box subjecting it to rotary stresses in opposite directions resisted by the ways.

10. The combination of a box, a frame having internal parallel ways therefor, a second frame having internal parallel ways for the first frame at an angle to the first ways, and means on the frames for adjusting the box producing rotary stresses in opposite directions resisted by the ways.

11. The combination of a box, a frame having internal parallel ways therefor, a second frame having internal parallel ways for the first frame at an angle to the first ways, and bolts on the frames for adjusting the box producing rotary stresses in opposite directions resisted by the ways.

12. The combination of a box, a frame having internal parallel ways therefor at different ends of said frame, a second frame having internal parallel ways for the first frame at an angle to the first ways, and bolts on the frames for adjusting the box producing rotary stresses in opposite directions resisted by the ways.

13. The combination with a frame provided with an aperture, opposite sides of which are provided with parallel ways, of a box adjustably seated within said aperture, with opposite sides thereof in contact with said ways, and means tending to rotate said box in one direction and thereby retaining both said sides of said box against said ways.

In testimony whereof I affix my signature in presence of two witnesses.

GEORGE M. HINKLEY.

Witnesses:
FRANK W. GREENLEAF,
J. S. HELLEWELL.